United States Patent [19]

Tanikoshi et al.

[11] Patent Number: 5,598,572
[45] Date of Patent: Jan. 28, 1997

[54] INFORMATION TERMINAL SYSTEM GETTING INFORMATION BASED ON A LOCATION AND A DIRECTION OF A PORTABLE TERMINAL DEVICE

[75] Inventors: Koichiro Tanikoshi, Hitachi; Masayuki Tani, Hitachinaka; Kimiya Yamaashi, Hitachi; Harumi Uchigasaki, Hitachinaka; Masayasu Futakawa; Masato Horita, both of Hitachi; Shoshiro Kuzunuki, Hitachinaka; Atsuhiko Nishikawa; Takekazu Maruyama, both of Mito, all of Japan

[73] Assignee: Hitachi, Ltd., Tokyo, Japan

[21] Appl. No.: 404,743

[22] Filed: Mar. 15, 1995

[30] Foreign Application Priority Data

Mar. 18, 1994 [JP] Japan .................. 6-048242

[51] Int. Cl.⁶ .................. G06F 9/24; G06F 13/42
[52] U.S. Cl. .................. 395/800; 342/450; 342/451
[58] Field of Search .................. 395/828, 800; 364/DIG. 1, DIG. 2, 578, 189, 449, 561, 557, 551.01; 361/686; 73/23.2; 342/450, 451, 463; 348/154

[56] References Cited

U.S. PATENT DOCUMENTS

| 4,152,760 | 5/1979 | Freitas et al. | 364/138 |
|---|---|---|---|
| 4,303,973 | 12/1981 | Williamson, Jr. et al. | 364/189 |
| 4,443,861 | 4/1984 | Slater | 395/828 |
| 4,725,970 | 2/1988 | Burrows et al. | 364/578 |
| 5,119,104 | 6/1992 | Heller | 342/450 |
| 5,211,052 | 5/1993 | Shakkattai et al. | 73/23.2 |
| 5,237,408 | 8/1993 | Blum et al. | 348/154 |
| 5,305,183 | 4/1994 | Teynor | 361/686 |
| 5,311,562 | 5/1994 | Palusamy et al. | 364/449 |

FOREIGN PATENT DOCUMENTS

| 3150389 | 7/1983 | Germany . |
|---|---|---|
| 8812007 | 12/1988 | Germany . |
| 62-267697 | 11/1987 | Japan . |

OTHER PUBLICATIONS

M. Polke, "Prozessleittechnik [Process Control Engineering]", R. Oldenburg Verlag München, 1st Edition 1991, Chap. 8, pp. 379–455.

*Primary Examiner*—Daniel H. Pan
*Attorney, Agent, or Firm*—Antonelli, Terry, Stout & Kraus, LLP

[57] ABSTRACT

An information terminal system including a process control computer and a portable terminal device for inputting information to said process control computer and gaining information from said process control, includes component information storing means for storing information for distinguishing each one of plural components composing a plant and component identifying means for identifying a component from plural components composing a plant and existing in the direction indicated by and at the location of the portable terminal device, by using information for distinguishing each one of the plural components stored in the component information storing means.

15 Claims, 10 Drawing Sheets

| COMPONENT NAME | COMPONENT ID | BOTTOM FACE OF COMPONENT (x1,y1) — (x2,y2), z | COMPONENT HEIGHT (h) |
|---|---|---|---|
| PUMP 1 | S5P001 | (100,100) — (200,200), 20 | 100 |
| COMPRESSOR 2 | S5C002 | (500,100) — (600,200), 0 | 50 |
| ⋮ | ⋮ | ⋮ | ⋮ |

INFORMATION TERMINAL SYSTEM GETTING INFORMATION BASED ON A LOCATION AND A DIRECTION OF A PORTABLE TERMINAL DEVICE

BACKGROUND OF THE INVENTION

The present invention relates to an information terminal system for gaining information on components in a plant or adjusting the components when a maintenance worker, walking around in areas of the plant, maintains or inspects each component.

Heretofore, in monitoring a plant, a maintenance worker looks at each component, inspects the states of each component and adjusts each component if needed, as part of periodic maintenance, in counteractions response to an accident or at the time of a start-up operation. For adjustment of some components, cooperation between field workers and personnel in a central control room is needed. For this purpose, a maintenance worker inspects the states of components by observing meters or instruments attached to the components. Some the components have no indicator and only send information concerning the components to a remote central control room. And, in some cases, information concerning another component, remote from the component to be treated, is needed. Therefore, it is convenient for maintenance worker to bring a portable terminal device connected to a process control computer in order to gain component information or to set control data for components. A component in the field to be inspected or adjusted is identified, and information concerning the component is observed, or control data is set into the component, by connecting the portable terminal device to a connection terminal provided at the component, or by inputting a code for identifying the component to be inspected using an input means provided at the portable terminal device.

And, in Japanese Patent Application Laid-Open 267697/1987, there is disclosed a portable terminal system in which a bar-code reader is provided at the portable terminal system to read a bar-code indication labeled on each of the components in the field.

In a portable terminal system using the above-mentioned method of inputting the codes of components, all of a large number of components can not be treated and only a limited number of components can be processed, since it is necessary to memorize components by correlating each of the components to a name or a code indicating the component.

Further, by the above-mentioned portable terminal system, which connected to a connection terminal of a component, it is very complicated and difficult to gain information on all object components or to set control data into all demanded components, since control data can be set into only the component which is currently connected to the portable terminal system.

Further, in the above-mentioned portable terminal system which identifies a component by reading a bar-code of the component, work efficiency is bad and the certainty of component identification is also not good, since the range in which a bar-code can be read out by the terminal system is limited. For some of the components installed remotely from the place where work is possible, maintenance work is probably impossible.

Also, since it is frequently required to compare simultaneously information concerning various components installed in a huge building and to adjust components while referring to the states of other components, observation of the component state information or control data setting of components is limited, and the quickness and certainty of the work is unattainable, in the conventional devised terminal system.

Further, it is impossible to send a command for registering states of an indicated component to another component or to transfer information concerning a plurality of indicated components in a lump to another object.

SUMMARY OF THE INVENTION

The present invention has been achieved in consideration of the above-described problems, and has the object of providing an information terminal system in which a maintenance worker can select freely any combination of object components, command the components to display their information, and operate the components, easily without affecting the certainty of the work.

To attain the above-mentioned object, the present invention provides an information terminal system having a process control computer and a portable terminal device for inputting information into and receiving information from the process control computer, the information terminal system comprising a component map information storing means for storing location information of a plurality of each of components composing a plant, a terminal location and direction measuring means for measuring the location and the direction of the above-mentioned portable terminal device and a component map collating means for identifying a component indicated by the portable terminal device, based on the location and the direction of the portable terminal device.

Further, the present invention provides another means for attaining the object by providing an information terminal system having a process control computer and a portable terminal device for inputting information into and receiving information from the process control computer, the information terminal system comprising a component information storing means for storing information concerning an external appearance, sounds or a temperature distribution of each of components composing a plant, a component information inputting means for inputting information concerning the external appearance, the sound or the temperature distribution of the component existing in the direction indicated by the portable terminal device and a component collating means for identifying the indicated component by comparing the input component information with the information stored in the component information storing means.

Further, the portable terminal device of an information terminal system according to the present invention includes a component identifier storing means for storing at least one of the identified components to be treated by the portable terminal device in the form of an identifier.

In the information terminal system according to the present invention, the location of the portable terminal device and the direction indicated by the portable terminal device are measured by the terminal location and direction measuring means for measuring the location and the direction of the portable terminal device. And, the component map collating means identifies the component indicated by the portable terminal device, based on the measured results and the location information of each component stored in the component map information storing means.

Therefore, use of the above-mentioned information terminal system, it is possible to conduct quick and certain maintenance work in a plant, since the object component to be treated can be identified only by directing the portable terminal device to a target component of plural components composing a plant.

In another information terminal system according to the present invention, the portable terminal device inputs the information concerning an external appearance, sounds or a temperature distribution of a component existing in the direction indicated by the portable terminal device. Then, the component indicated by the portable terminal device is identified by collating the input information concerning the external appearance, the sounds or the temperature distribution of the component with the information stored in the component information storing means by using the component collating means.

By means of the above-mentioned information terminal system, it is possible to conduct quick and certain maintenance work of a plant, since the object component to be treated can be identified namely by directing the portable terminal device to a target component of plural components composing the plant.

Furthermore, since the portable terminal device of the information terminal system according to the present invention includes a component identifier storing means for storing at least one of the identified components to be treated by the portable terminal device in the form of an identifier, it is possible to send a command for registering states of the indicated component to another component or to transfer information concerning a plurality of indicated components in a lump to another object.

DETAILED DESCRIPTION OF THE EMBODIMENTS

Figure 1:
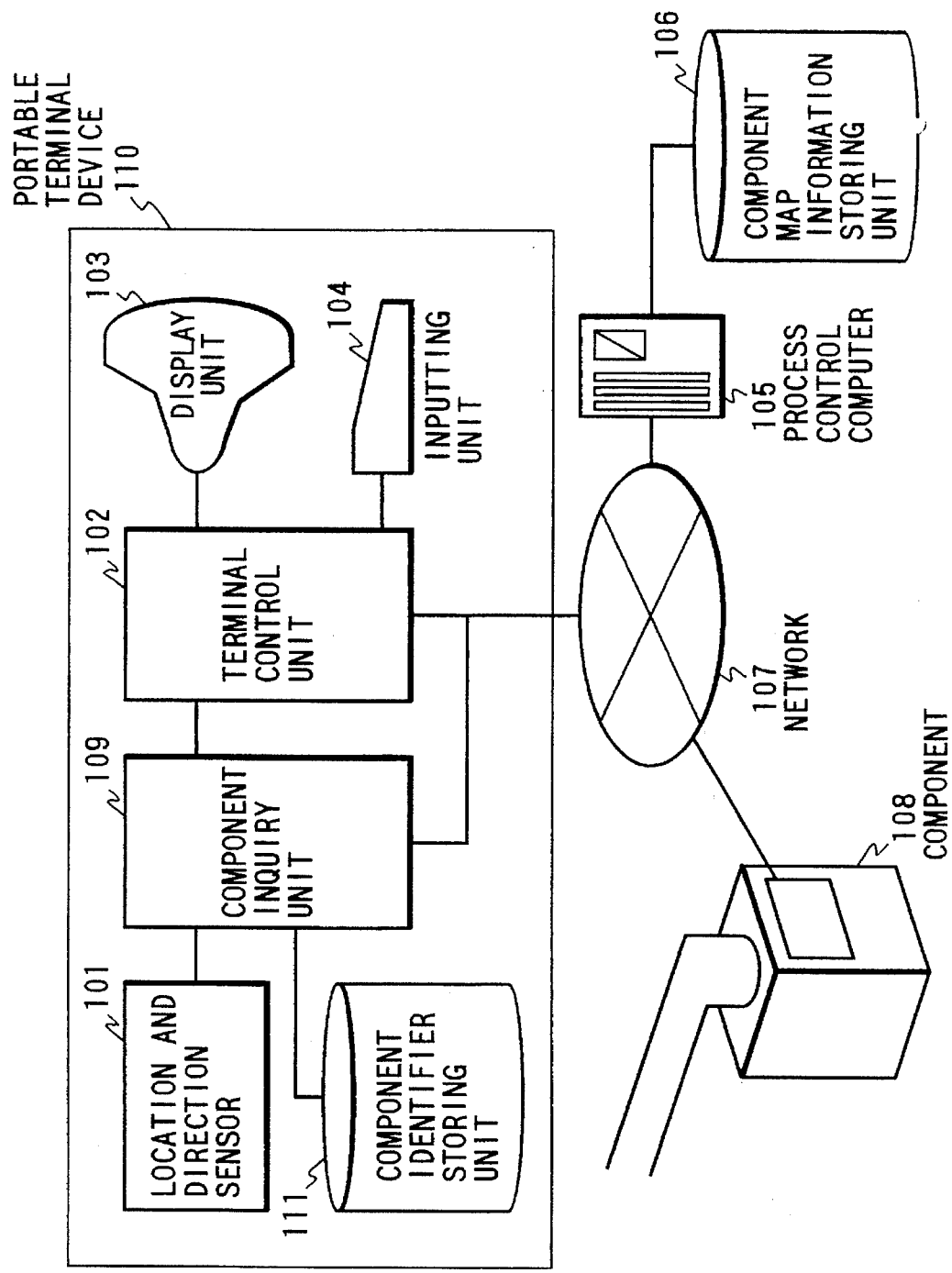
FIG. 1 is a diagram showing a constitution of an embodiment of an information terminal system for plant monitoring by using a location and direction sensor.

Hereinafter, details of the present explained based on various embodiments illustrated in the drawings.

FIG. 1 is a diagram showing the constitution of an embodiment of an information terminal system for plant monitoring by using a location and direction sensor.

The numeral 110 indicates a portable terminal device for plant monitoring, the numeral 108 indicates a plant component, the numeral 101 indicates a location and direction sensor, the numeral 102 indicates a terminal control unit, the numeral 109 indicates a component inquiry unit, the numeral 111 indicates a component identifier storing unit, the numeral 103 indicates a display unit, the numeral 104 indicates an inputting unit, the numeral 105 indicates a process control computer, the numeral 106 indicates a component map information storing unit and the numeral 107 indicates a network.

Figure 2:
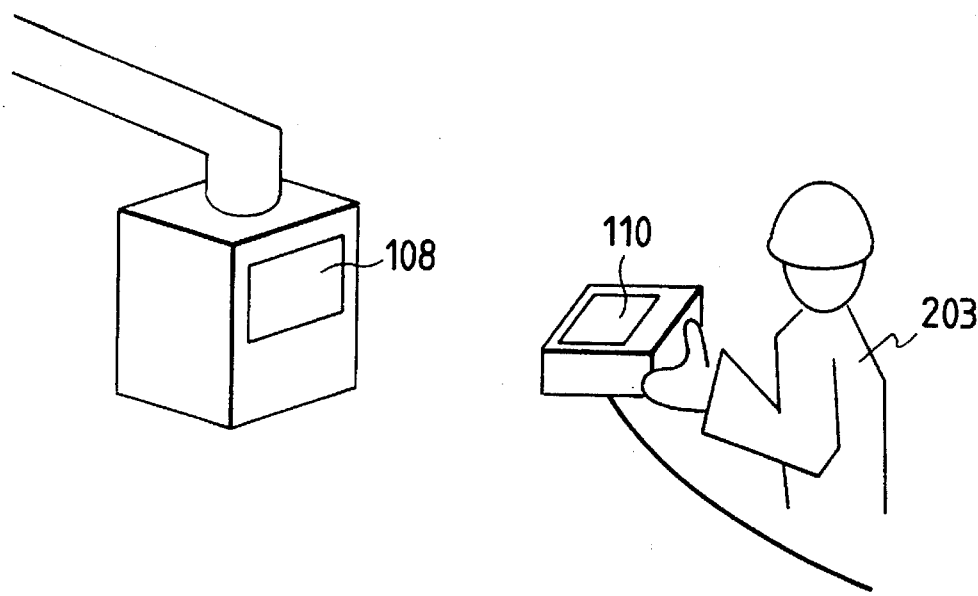
FIG. 2 is a diagram showing a manner of using a portable terminal device included in the information terminal system for plant monitoring.

FIG. 2 is a diagram for showing the manner of use of a portable terminal device included in the information terminal system for plant monitoring. The numeral 108 indicates a component, the numeral 110 indicates the portable terminal device and the numeral 203 indicates a maintenance worker of a plant.

As the location and direction sensor, various kinds of sensors are applicable, and an ultrasonic sensor is used in this embodiment. For this purpose, plural ultrasonic sources are arranged in the form of an array on floors of the plant. An ultrasonic sensor having a measurable range which is a circular cone having an apex angle of 100° and a hypotenuse of 150 cm is used. And, the ultrasonic sources are arranged at an interval of 60 cm so that the space over the floor is filled up by a plurality of virtual circular cones, each having the same dimension as the above-mentioned cone, at each apex of which an ultrasonic source is provided on the floor. At the top part of the portable terminal device, a sensing part for receiving ultrasonic waves from the ultrasonic sources is provided. Signals received by the sensing part are transmitted to the process control computer to which the ultrasonic sources are connected via the network.

When the sensing part is directed in a particular direction at a particular location, ultrasonic waves from plural ultrasonic sources are sent to the process control computer. Then, the process control computer calculates the relative location and direction between the sensing part and the ultrasonic source based on the ultrasonic wave data from the ultrasonic source nearest to the sensing part. Further, the process control computer searches the location of the ultrasonic source in absolute coordinates, and calculates the absolute location and direction of the sensing part in the plant by using the calculated relative location and direction of the sensing part. The data of the calculated absolute location and direction of the sensing part are transmitted to the portable terminal device via the network when data is required from the component inquiry unit 109.

In case information concerning a specific component is necessary or a specific component needs to be controlled, a maintenance worker 203 directs the portable terminal device 110 to the specific component 108 and inputs a command for selecting the component using the inputting unit 104. The command is accomplished by selecting an item from a displayed menu or by actuating a specific key. If the command is received by the terminal control unit 102, the terminal control unit 102 determines the selected component by using a predetermined algorithm, and it becomes possible to display information concerning the selected component on the display unit 103 or to control the selected component by using the inputting unit 104.

Figure 3:
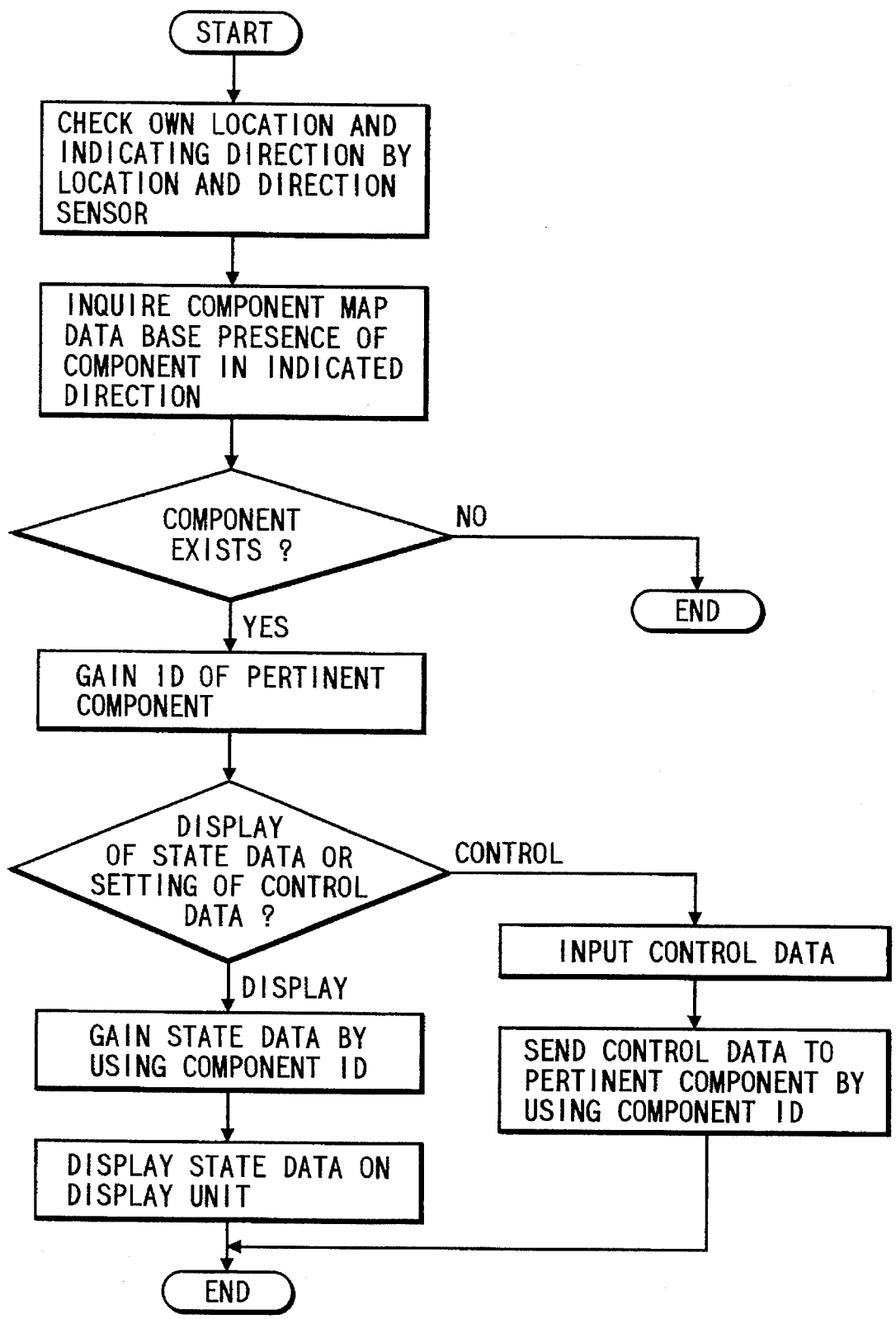
FIG. 3 is a flow chart showing operations of the embodiment of FIG. 1.

FIG. 3 is a flow chart showing operations of the embodiment. At first, the location of the portable terminal device and the indicated direction thereof are detected by the location and direction sensor 101. By using the information indicating the location and direction of the sensor, the component inquiry unit 109 sends a request for identification of components in the indicted direction at the indicated location to the process control computer 105 via the network 107. In response, the process control computer 105 determines the presence of components in the direction and location by using the indicated component map information storing unit 106. The determination of the component presence may be executed by a computer other than the process control computer or by a data processing function provided in the portable terminal device.

Figures 4, 5:
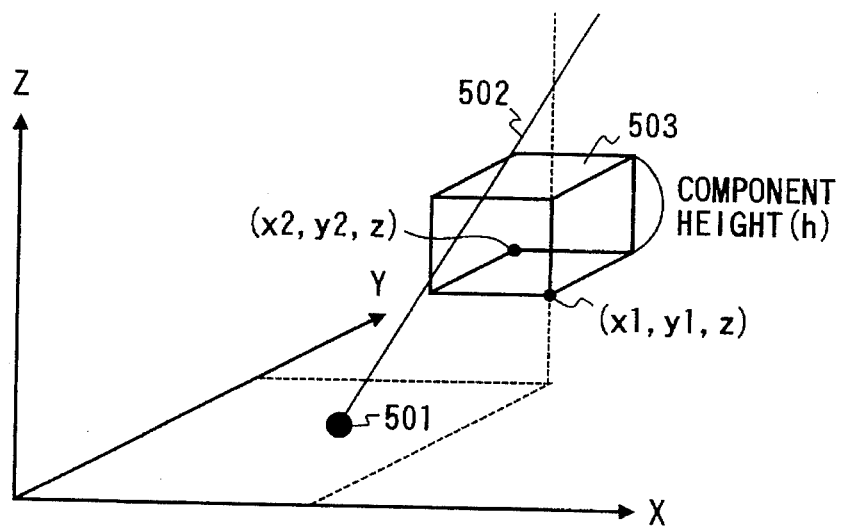
FIG. 4 shows an example of the contents of data stored in a component map information storing unit.
FIG. 5 is a diagram which shows a principle of identifying the indicated component in the embodiment of FIG. 1.

FIG. 4 shows a example of the contents of a data base stored in the component map information storing unit 106 of the embodiment. As shown by the figure, an identifier, a location and a size of the bottom face and a height (h) of each component are registered in the data base.

FIG. 5 shows a principle of identifying the indicated component. The numeral 501 indicates the location of a maintenance worker, the numeral 502 identifies a line showing the direction of the direction sensor as directed by the maintenance worker at the location 105 and the numeral 503 indicates a rectangular parallelepiped representing a component.

The location 501 of the maintenance worker and the line 502 showing the direction of the direction sensor as directed by a maintenance worker are obtained based on the information transmitted from the portable terminal device. Then, it is determined whether or not the obtained line 502 intersects the rectangular parallelepiped 503 on the basis of the location, the size of its bottom face and its height, of which data is stored in the component map information storing unit 106. The intersection determining process is repeated according to the number of components registered in the component map information unit until a rectangular parallelepiped intersected by the line 502 is found. Then, the intersection determining process is stopped when one rectangular parallelepiped intersected by the line 502 is found or when the one nearest to the location of a maintenance worker is found from all of the ones intersected by the line 502. In either case, the determining result is either that an indicated component is found or that one is not found.

If the indicated component is found, the ID of the component is sent back to the component inquiry unit 109; and otherwise, null data for an ID is sent to the unit 109. The component inquiry unit 109 sends the component ID to a component identifier storing unit 111. Hereinafter, the terminal control unit 102 inquires as to the component IDs stored in the component identifier storing unit 111 if needed, and exchanges data concerning components with the process control computer 105 and other components by using the component IDs.

For example, if a maintenance worker 203 requests state values of a specified component by using the inputting unit 104, the terminal control unit 102 inquires as to the state values of the component to the process control computer 105 by using the ID of the component. The process control computer obtains the state values of the component 108 via the network 107 and sends them to the terminal control unit 102. The terminal control unit 102 displays the states values to the maintenance worker by using the display unit 103.

And, in case a maintenance worker 203 sets control data into a specified component by using the inputting unit 104, the terminal control unit 102 sends a command for setting the control data into the component to the process control unit 102 by using the ID of the component. Then, the process control computer sets the sent control data into the component 108 via the network 107.

If null data for the ID of a component is sent, the component inquiry unit 109 informs the terminal control unit 102 that the indicated component has not found. Then, the terminal control unit 102 will display to the maintenance worker 203 a message that the indicated component can not be found. By the above-mentioned features of the invention, the component for which a maintenance worker intends to gain information, or to set control data into, can be identified, and information concerning the component can be gained and control data for the component can be set, merely by pointing to an object component using the portable terminal device without inputting a name or a code of the component.

If the component 108 itself includes a processor, the portable terminal device can directly send control data to or receive component information from a specific component without necessarily requesting the information concerning the component from the process control computer.

In the above-mentioned case, the terminal control unit 102 requests the desired state values of the component directly from the component 108 if it is judged by the terminal control unit that the processing in the process control computer is congested. Then, the component sends the state values to the terminal control unit 102 by return communication and the terminal control unit 102 will display the state values on the display unit 103. Judging the congestion of processing in the process control computer can be also automatically conducted by the process control computer itself. The terminal control unit broadcasts the ID of a specific component, of which the state values are required, on the network. The process control computer replies to the inquiry by the terminal control unit 102 as it has done, but does not reply to the inquiry if the process control computer itself is busy. If a reply by the process control computer is not received on the network after a predetermined time, the component 108 detects absence of the reply by the process control computer and replies to the inquiry by itself. The terminal control unit 102 displays the sent state values. By the above-mentioned method, data processing concerning a desired component can be executed even in the high load state of the process control computer.

In the above-mentioned cases, the state values are observed, or the control data is set, for one component. However, it is usual that the state values of plural components installed at one place are observed as a group. By the present invention, such processing as mentioned above can be successively executed for plural components.

In case information concerning a specific component is necessary or a specific component needs to be controlled, a maintenance worker 203 points the portable terminal device 110 to the specific component 108 and inputs a command for selecting the component using the inputting unit 104. The command is accomplished by selecting an item from a displayed menu or by actuating a specific key. When the command is received by the terminal control unit 102, the terminal control unit 102 determines the selected component using a predetermined algorithm, and the component ID is registered in the component identifier storing unit 111 if the selected component is identified. The above-mentioned processing is repeated for all components of which the state values are required.

When a command for starting component state monitoring is sent to the portable terminal device 110 after the indications to all the required components by the portable terminal device are completed, the terminal control unit 102 requests the process control computer 105 to send all the component IDs stored in the component identifier storing unit 111 and the state values of all the required components via the network 107. The process control computer 105 sends the state values of the required components to the terminal control unit 102 via the network 107 by communication, and the terminal control unit displays the state values on the display unit 103. Further, it is possible directly to gain the state values from each component other than via the process control computer.

By using the portable terminal device for plant monitoring, the efficiency of inspection and maintenance also can be improved. In the inspection and maintenance work, it is required to perform checking of a meter, an appearance, etc. of a component one by one. When the portable terminal device is used for the component checking work, a maintenance worker indicates a component by the terminal device 110 and inputs a command for confirmation of the indicated component by the inputting unit, while patrolling in the plant. When the command is received by the terminal control unit 102, the terminal control unit 102 determines the indicated component by using a predetermined algorithm, and the component ID is registered in the component identifier storing unit 111 if the object component is identified. Then, by using the component ID, it is requested that the process control computer or another computer for exclusively managing the maintenance of a plant determine whether or not the indicated component is designated as one of the components to be inspected or maintained. If the indicated component is not so designated, it is displayed that the indication of the component is erroneous.

As mentioned above, a maintenance worker checks each component one by one to determine if the component is to be inspected or maintained. Finally, the IDs of all the checked components are sent to the process control computer or another computer for exclusively managing the maintenance of the plant, and the IDs are stored in either of the computers. By examining the stored IDs, it is confirmed that all the components to be inspected are checked.

Although the method of checking the intersection of the line representing the indicated direction and the rectangular parallelepiped representing a component is executed for identifying the indicated component in the above-mentioned embodiment, another component identifying method may be employed. For example, the indicated component can be identified as the component nearest to the maintenance worker by calculating the distance between the worker and each one of the components. This method can simply and quickly identify the indicated component without using the complicated method of determining the intersection of a line with the component.

Further, although the component information data base is provided in the process control computer in the embodiment, the component information data base can be provided in the portable terminal device. However, in such a system, the maintenance of the data bases is troublesome in the event of changes of components, since each one of the portable terminal devices has the same data base, respectively.

Then, in adopting such a system constitution, the time for maintaining each of the data bases is saved by providing a means for automatically maintaining each of the data bases, for example, a means for sending a command for renewing each of the data base to each of the portable terminal devices at a predetermined timing by using a broadcast method.

In the embodiment, the system wherein a portable terminal device is always connected to the network has been explained, but a system in which the terminal device is carried by disconnecting the terminal device from the network using a terminal connector is also possible. In order to realize the latter constitution, receptacles connected to the network are provided in several places on each floor in the plant and the portable terminal device is connected to one of the receptacles when a maintenance worker wants to get information concerning a component. After the connection, it is possible to gain information concerning the component and to set control data into the component merely by indicating the object component, by the same operations as mentioned above.

Figure 12:
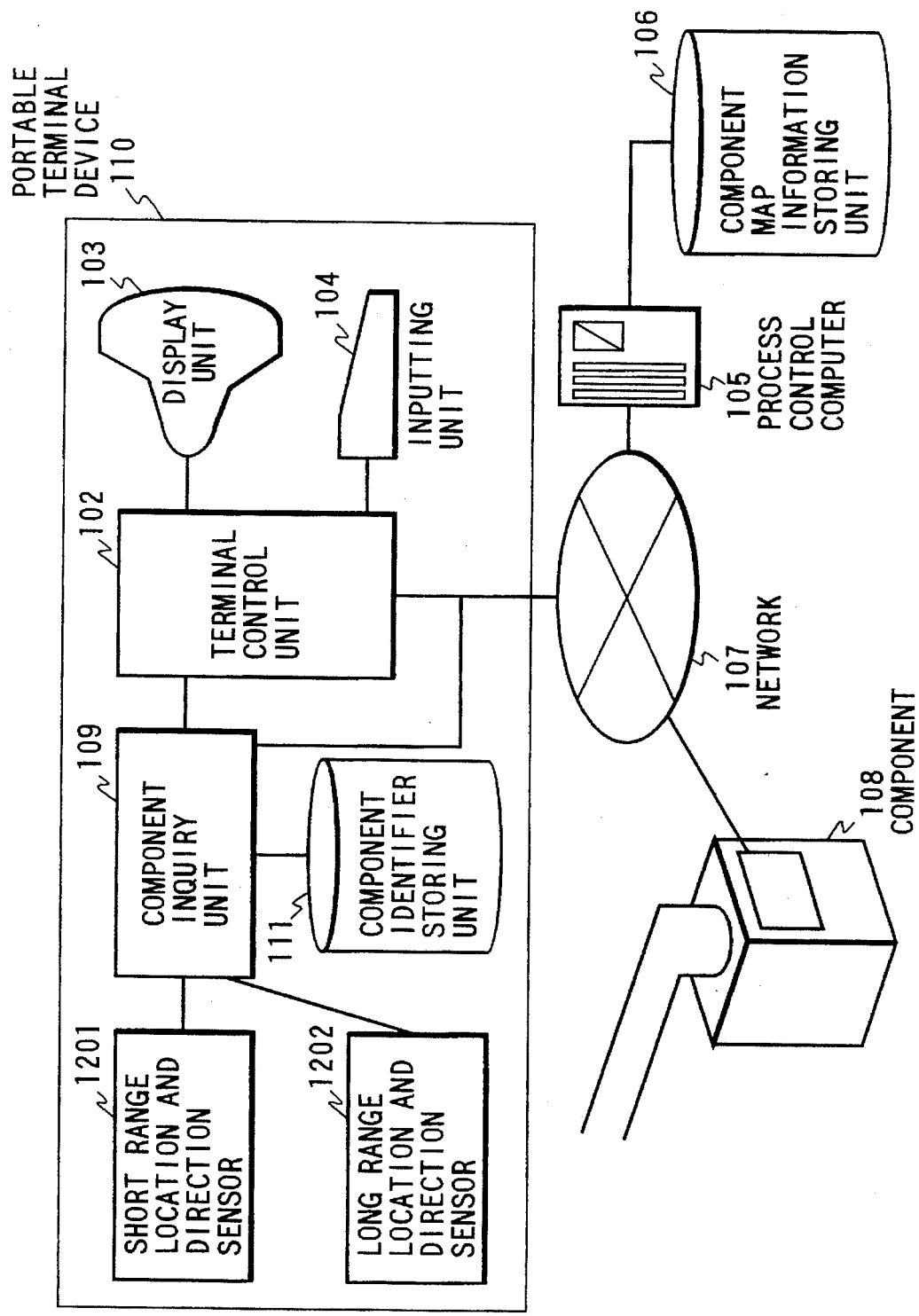
FIG. 12 is a diagram showing the embodiment of FIG. 1, wherein two kinds of location and direction sensors are used as location and direction sensing means.

FIG. 12 is a diagram of the embodiment shown by FIG. 1, wherein two kinds of location and direction sensors are used as location and direction sensing means. The numeral 1201 indicates a short range location and direction sensor, the numeral 1202 indicates a long range location and direction sensor and the rest of the elements are the same ones shown in FIG. 1.

Each type of sensor for measuring location and direction has merits and demerits, and a sensor capable of correctly measuring both the location and the direction of an object component in such a wide place as a plant costs too much. Therefore, the following method using more than two kinds of sensors is effective. That is, one sensor roughly measures the location of a component and the other one measures the location and the direction of the component in detail based on the roughly measured location. In the following, the method will be explained.

In case information on a specific component is necessary or a specific component needs to be controlled, a maintenance worker 203 directs the portable terminal device 110 to the specific component 108 and inputs a command for selecting the component using the inputting unit 104. When the command is received by the terminal control unit 102, the terminal control unit 102 determines the selected component by using a predetermined algorithm, and the information concerning the selected component is displayed on the display unit 103 or the selected component is controlled by using the inputting unit 104.

The component inquiry unit 109 gains information on the location and the direction from the short range location and direction sensor 1201. The gained information represents the relative location or direction of the component in a room or a building. As a short range location and direction sensor, the previously mentioned ultrasonic sensor can be used. On the other hand, the long range location and direction sensor 1202 can roughly detect the location of the portable terminal device 110 in a plant. For example, the location of the terminal device is determined in a unit of area such as a room or a building of a plant. As to a long range location and direction sensor, for example, the active-badge developed by Olivette company is applicable. When the active-badge approaches one of a number of signal dispatching elements provided at predetermined points, the active-badge can detect that signal dispatching element. By providing the signal dispatching elements at various points in a plant and installing the active-badge in the portable terminal device, the portable terminal device can gain information as to its rough location in a plant. Therefore, the short range sensor does not need to possess an ability to detecting the absolute location and direction in a plant, but only to possess an ability to detect the relative location and direction in a unit of area in a plant.

The component inquiry unit 109 inquires as to the location and direction information also from the long range location and direction sensor 1202 and gains the detailed absolute location and direction of the portable terminal device 110 by using the information from both the long range sensor and the short range sensor.

Then, by using the gained information concerning both the location and the direction, the component inquiry unit 109 inquires from the process control computer 105 whether or not components exist in the indicated direction via the network 107. The process control computer 105 determines whether or not components exist in the indicated direction by using the component map data base in the component map information storing unit 106. The determining method is the same method of determining the intersection of a line with a component as applied in using the portable terminal device having one location and direction sensor. If the indicated component is found, the ID of the component is sent back to the component inquiry unit 109; otherwise, null data for the ID is sent to the unit 109. The component inquiry unit 109 sends the component ID to the terminal control unit 102 and the component identifier storing unit 111. Then, the terminal control unit 102 inquires as to the component IDs stored in the component identifier storing unit 111 if needed, and will exchange the data of components with the process control computer 105 and other components.

As mentioned above, by using the both the long and the short range location and direction sensors, the required function of detecting the location and direction of the portable terminal device can be realized with low cost without using a high performance and expensive location and direction sensor.

Figure 6:
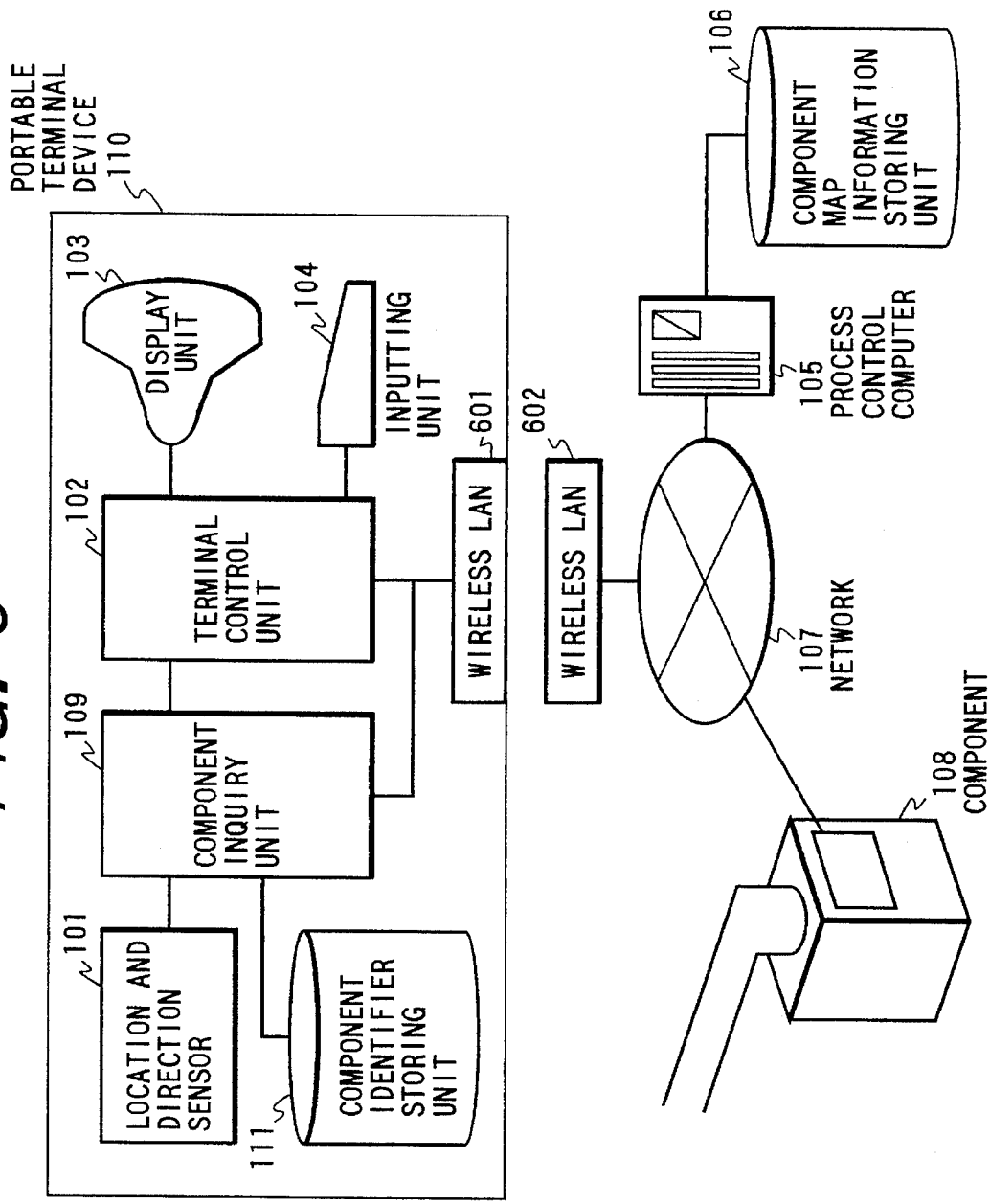
FIG. 6 is a diagram showing the embodiment of FIG. 1 to which a wireless LAN is applied.

FIG. 6 is a diagram of the embodiment shown by FIG. 1 to which a wireless LAN is applied.

The numerals 601 and 602 indicate a wireless LAN and the rest of the elements are the same ones shown in FIG. 1. Since the fundamental operations of each part of the embodiment shown by FIG. 6 is the same as that of the embodiment shown by FIG. 1, only those features which are different from the ones shown by FIG. 1 will be explained in detail in the following.

The location and direction sensor 101 detects the location of the portable terminal device and the direction indicated by the portable terminal device. By using the detected location and direction, the component inquiry unit 109 requires the process control computer 105 to identify the indicated component. In the inquiry, a packet for communicating with the process control computer 105 is generated in the wireless LAN 601. The example, the contents of the packet may include the destination of the packet, the contents of the inquiry and the relevant parameters. In this case, the destination of the packet is "the process control computer", the contents of the inquiry "Does the indicated component exist?" and the relevant parameters" (x1, y1, z1)–(x2, y2, z2): (the former is the spatial location of the maintenance worker and the latter is the direction of pointing by the terminal device).

The wireless LAN 601 transmits the received packet to a receiving wireless LAN 602 connected to the network 107 by using light or electric signal transmission. When the receiving LAN 602 receives the packet, it checks the destination of the packet and sends the packet to the process control computer 105.

The process control computer determines whether or not any component exists in the indicated direction by confirming the contents of the inquiry and the relevant parameters, using the component map data base stored in the component map information storing unit, when the process control computer receives the packet. Then, the algorithm for checking for the presence of a component as explained with reference to FIG. 5 is employed.

If the pertinent component is found, the data concerning the found component is returned as a reply packet. For example, the contents of the reply packet may include the destination of the packet, the reply message and the relevant parameters. In this case, the contents are "the portable terminal device 1" (the destination of the reply packet and the dispatching origin of the inquiry packet), "the pertinent component exist." (the reply message) and "S5P001: component ID" (the reply parameter). If the pertinent component is not found, a packet indicating that the pertinent component can not be found is returned. For example, the packet may be composed of the destination of the packet and the reply message. In this case, the contents of the packet are "the portable terminal device 1" (the destination of the packet), and "the pertinent component does not exist." (the reply message).

The packet is passed on a route reverse to that of the inquiry packet, i.e. it is sent to the wireless LAN 602 and transmitted to the wireless LAN 601. If the component inquiry unit 109 receives the a reply packet with indicates that the pertinent component is found, it takes out the component ID from the packet and transfers the component ID to the component identifier storing unit 111. Hereinafter, the terminal control unit 102 inquires as to component IDs stored in the component identifier storing unit 111 if needed, and will exchange data concerning components with the process control computer 105 and other components.

If the component inquiry unit 109 receives a returned packet which indicates that the pertinent component is not found, it informs the terminal control unit 102 that the indicated component is not found. Then, the terminal control 102 will display to a maintenance worker 203 a message that the indicated component can not be found.

By the above-mentioned embodiment using wireless LANs, the component which a maintenance worker intends to gain information on, or into set control data to, can be also identified, and the information concerning the component can be gained and the control parameters for the component can be set, merely by indicating an object component by the portable terminal device without inputting a name or a code of the component.

Further, the portable terminal device can be utilized as an effective alarm device. The alarm device of a portable terminal device will be explained with reference to FIG. 2.

If the process control computer 105 request a component ID from the portable terminal device, it stores the name of that portable terminal device and the found component ID in a terminal table in which the name of the portable terminal device is stored together with the component ID.

After the component ID is obtained, a maintenance worker obtains the information concerning the component or sets control data into the component, but sometimes looks away or departs from the portable terminal device 110. If a serious accident occurs in the plant while the maintenance worker is looking away or has departed from the terminal device, the process control computer 105 for components in the area which are placed in danger by the accident and component IDs of the components closely related to the accident. Such searching can be realized by storing a group of problem components corresponding to each assumed accident in advance or by checking components one by one and picking up components which are getting into danger.

If such searched component IDs are found in the prepared terminal table, the process control computer 105 sends an alarm flag to the pertinent portable terminal device. When the portable terminal device 110 receives the alarm flag, it indicates the occurrence of danger to the maintenance worker 203 with a sound or change of displayed pictures by using the display unit. If occasion demands, a spotlight device of which the indicating direction can be controlled from the outside, may be attached to the portable terminal device 110, and the attention of the maintenance worker can be directed to the problem by lighting up the problem component with the spotlight device. Further, by providing a speaker, a lamp, etc. in the plant, an alarm can be also dispatched to the maintenance worker with such equipment.

Figure 7:
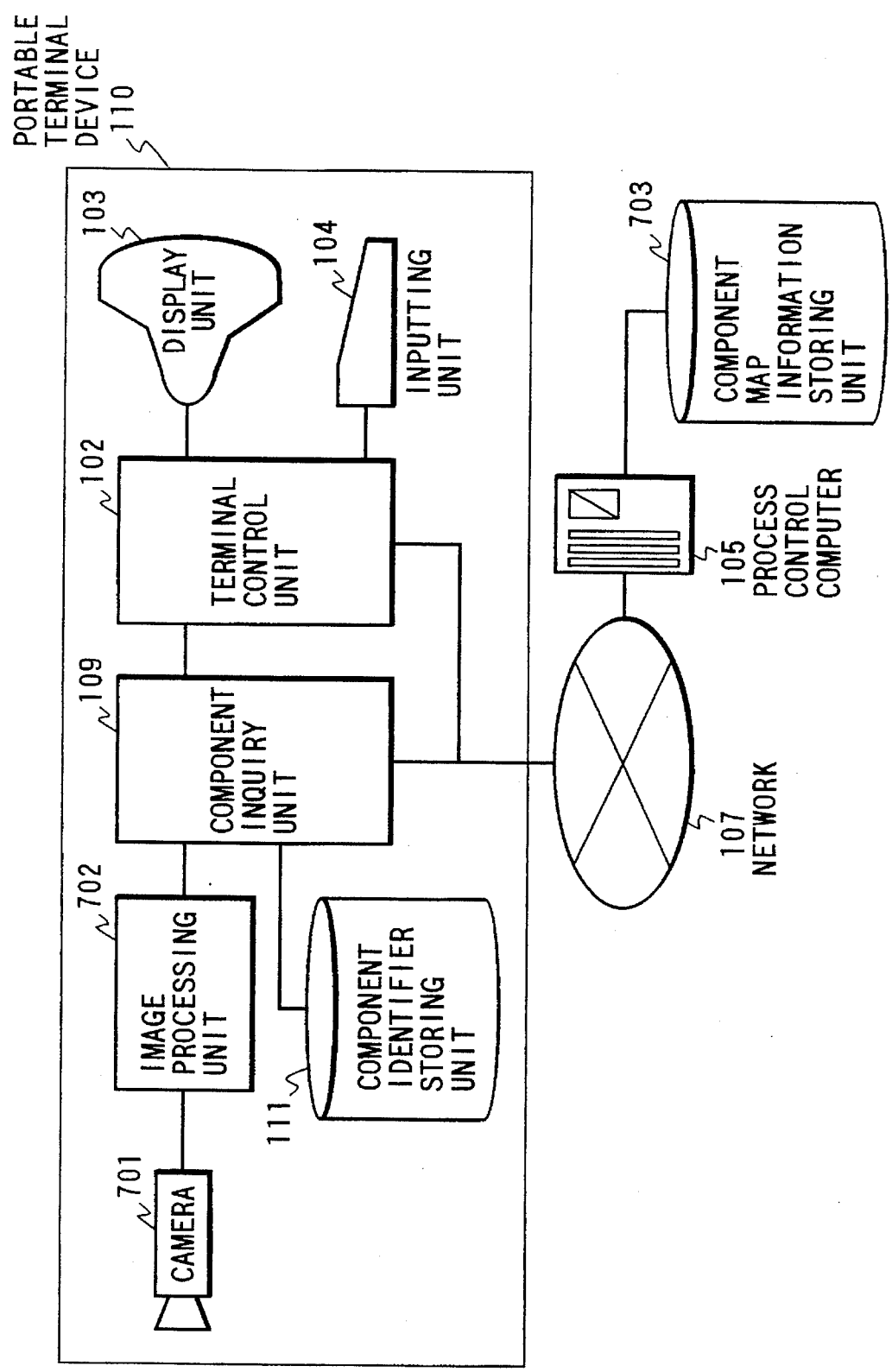
FIG. 7 is a diagram showing the constitution of another embodiment of an information terminal system for plant monitoring using an image processing unit.

FIG. 7 is a diagram showing another embodiment of an information terminal system for plant monitoring using an image processing unit.

The information terminal system comprises a camera 701, an image processing unit 702, a component appearance information storing unit 703, a terminal control unit 102, a display unit 103, an inputting unit 104, a process control unit 105, a network 107, a component inquiry unit 109, a portable terminal device 110 and a component identifier storing unit 111.

The image processing unit 702 extracts appearance features of the component indicated by the portable terminal device 110, by using the camera 701. The feature information is sent to the component inquiry unit 109 if needed. In case information concerning a specific component is necessary or a specific component needs to be controlled, a maintenance worker 203 directs the portable terminal device 110 to the specific component 108 and inputs a command for selecting the component using the inputting unit 104. The command is accomplished by selecting an item from a displayed menu or by actuating a specific key.

When the command is received by the terminal control unit 102, the terminal control unit 102 determines the selected component by using a predetermined algorithm, and the information for the selected component is displayed on the display unit 103 or the selected component is controlled by using the inputting unit 104. In the following discussion, operations of the embodiment will be explained more in detail.

At first, the image processing unit 702 extracts the features of the component appearance indicated by the camera 701 attached at the portable terminal device. Then, the component inquiry unit 109 inquires, as to whether or not the indicated component is stored, from the process control computer 105 via the network 107, by sending the feature information thereto. And, the process control computer determines whether or not the indicated component is stored by using the component appearance information storing unit 703.

Figure 8:
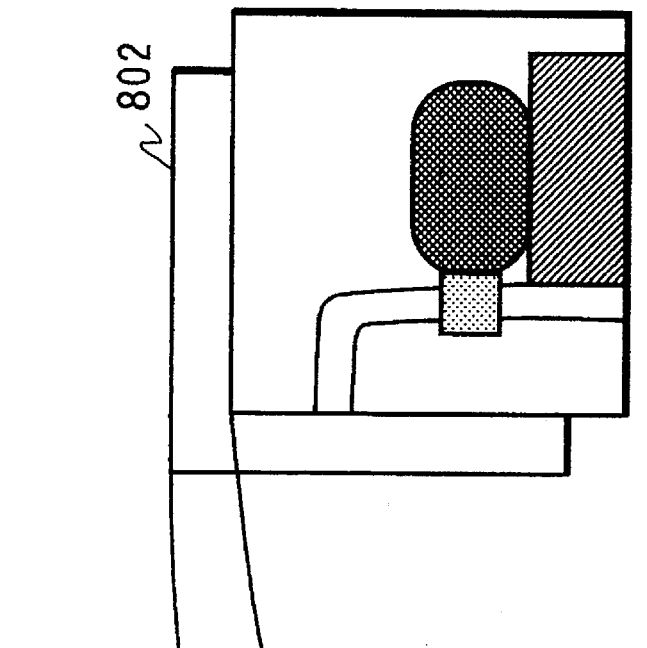
FIG. 8 is a diagram which shows an example of the contents of data stored in a component appearance information storing unit of the embodiment shown by FIG. 7.

FIG. 8 shows an example of the contents of data stored in the component appearance information storing unit 703 of the embodiment shown by FIG. 7. The numeral 801 indicates a data base and the numeral 802 indicates component image information data contained in the data base. In the component appearance information unit 703, the component appearance information data is registered together with the name of the each of components and the component ID. And, it continues to compare the image information sent from the portable terminal device with the component appearance information data 802 in the component appearance information storing unit 703, until the component appearance information data coincident with the sent image information is found. Naturally, the image of a component is probably distorted, extended or reduced, in accordance with the distance or the direction between the indicated component and the portable terminal device 110, so that the comparison operation does not merely compare the shapes of two images, but such pattern features of the two images as shape, color, etc. are used in the comparison.

As to the above-mentioned comparison, two methods are applicable, that is, one method is to stop the comparison when one coincidence is found and the other method is to compare the sent image information with all the appearance information data stored in the appearance information storing unit and to select the component having the appearance information data nearest to the sent image information. If the indicated component is found, the ID of the component is sent back to the component inquiry unit 109; otherwise, null data for the ID is sent to the unit 109. The component inquiry unit 109 sends the component ID to a component identifier storing unit 111. Thereafter, the terminal control unit 102 inquires as to component IDs stored in the component identifier storing unit 111 if needed, and exchanges the data concerning components with the process control computer 105 and other components.

Further, in this embodiment, if an infrared ray camera is used, the temperature distribution of a component can be obtained. By utilizing features in the temperature distribution of each component, a component can be also specified. With this method, a temperature distribution pattern for each component is registered in place of the component appearance information data 802.

At first, the image processing unit 702 obtains the temperature distribution of the component indicated by the camera 701 attached to the portable terminal device. Then, the component inquiry unit 109 inquires as to whether or not the indicated component is stored, from the process control computer 105 via the network 107, by sending the gained temperature distribution thereto.

Since a temperature distribution pattern for each component is stored in the component appearance information storing unit 703, a search can be made for a component having a pattern coincident with the sent pattern.

The searching processing is stopped when one coincidence is found or when a component having a pattern nearest to the sent pattern is selected after the searching is carried out for all of the registered components. In either case, the determining result is either that the indicated component is found or that one is not found.

If the indicated component is found, the ID of the component is sent back to the component inquiry unit 109; otherwise, null data for the ID is sent to the unit 109. The component inquiry unit 109 sends the component ID to a component identifier storing unit 111. Thereafter, the terminal control unit 102 inquires as to component IDs stored in the component identifier storing unit 111 if needed, and exchanges the data concerning components with the process control computer 105 and other components.

Figure 9:
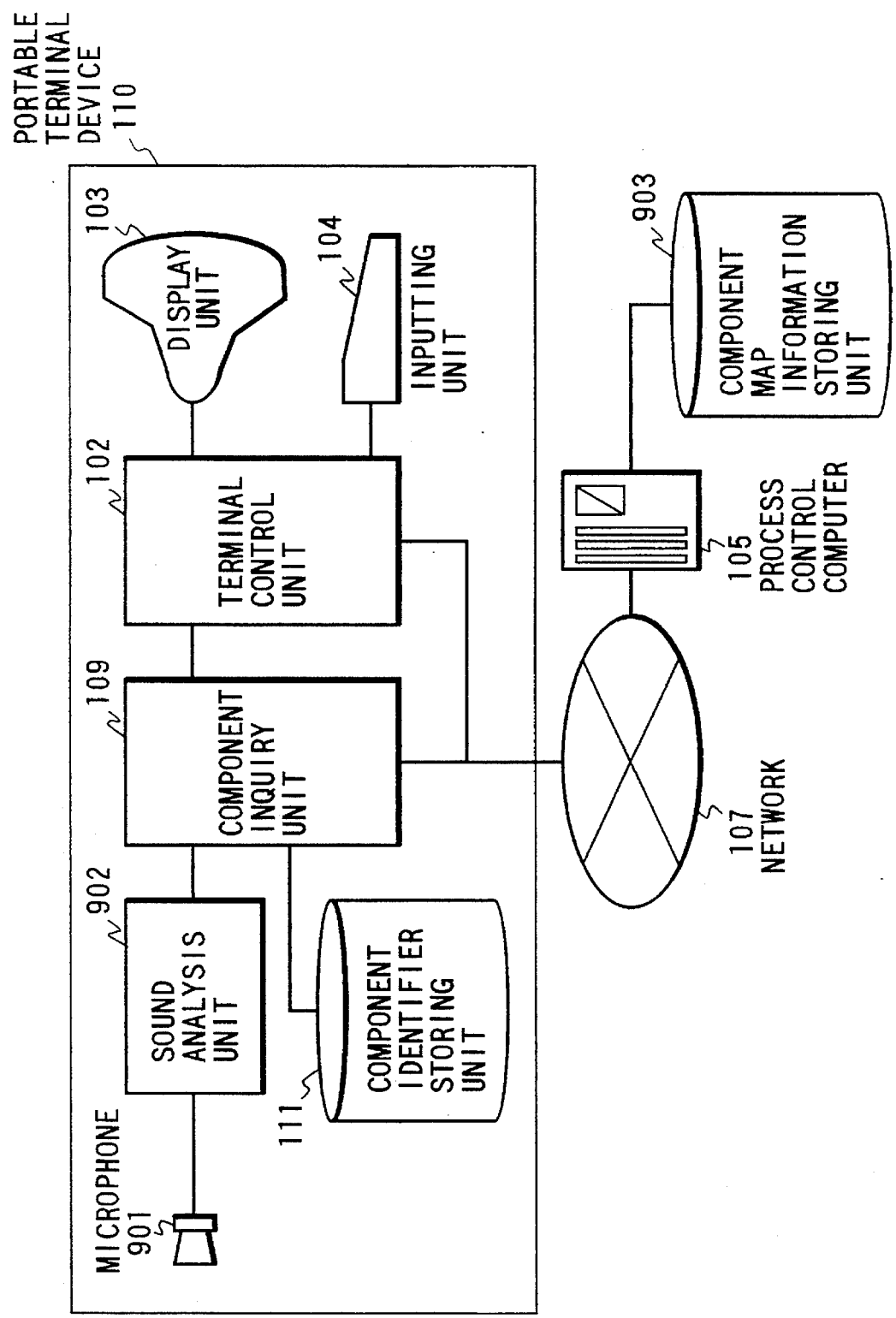
FIG. 9 is a diagram showing the constitution of another embodiment of an information terminal system for plant monitoring using a sound analysis unit.

FIG. 9 is a diagram showing another embodiment of an information terminal system for plant monitoring using a sound analysis unit.

The information terminal system of this embodiment comprises a microphone 901, a sound analysis unit 902, a component sound information storing unit 903, a terminal control unit 102, a display unit 103, an inputting unit 104, a process control unit 105, a network 107, a component inquiry unit 109, a portable terminal device 110 and a component identifier storing unit 111.

At first, the image processing unit 902 extracts the features of the sounds generated by a component existing in the direction indicated by the microphone 901 attached to the terminal device 101. Then, the component inquiry unit 109 inquires as to whether or not the indicated component is stored from the process control computer 105 via the network 107, by sending the sound feature information thereto. And, the process control computer determines whether or not the indicated component is stored by using the component sound information storing unit 903.

In the component sound information unit 903, the component sound information data is registered together with the name of each component and the component ID. And, it continues to compare the features of the sound information sent from the portable terminal device with the sound feature information data stored in the component sound information storing unit 903, until sound feature information data coincident with the sent features of the sound information is found.

As to the comparison operation, two methods are applicable, that is, one method is to stop the comparison when one coincidence is found and the other method is to compare the sent features of the sound information with all the sound feature information data stored in the component sound information storing unit and to select the component having the sound feature information data nearest to the sent features of the sound information. If the indicated component is found, the ID of the component is sent back to the component inquiry unit 109; otherwise, null data for the ID is sent to the unit 109. The component inquiry unit 109 sends the component ID to a component identifier storing unit 111. Thereafter, the terminal control unit 102 inquires as to component IDs stored in the component identifier storing unit 111 if needed, and exchanges the data concerning components with the process control computer 105 and other components.

Then, if a component does not generate distinctive sounds, for distinguishing it from the other components, this may be dealt with by attaching an element for generating a sound with a distinctive feature to the component. By such method, it is possible to designate and distinguish a component which does not usually generate a sound.

Figure 10:
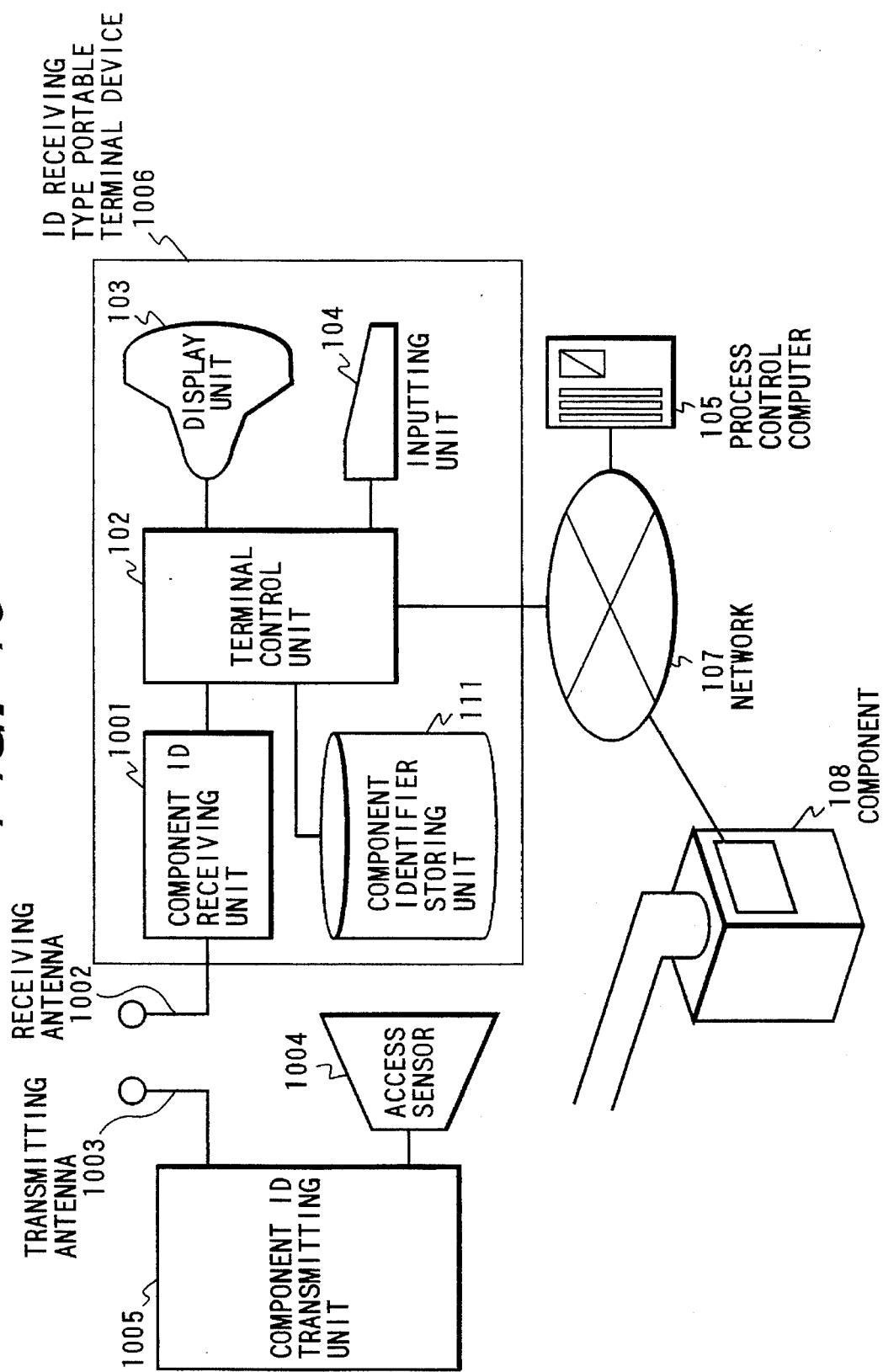
FIG. 10 is a diagram showing the constitution of another embodiment of an information terminal system for plant monitoring including a component identifier (ID) sending apparatus having an access sensor.

FIG. 10 is a diagram showing another embodiment of an information terminal system for plant monitoring using a component identifier (ID) sending apparatus having an access sensor.

The information terminal system of this embodiment comprises a component ID receiving unit 1001, an ID receiving antenna 1002, an ID transmitting antenna 1003, an access sensor 1004, a component ID transmitting unit 1005, an ID receiving type portable terminal device 1006, a terminal control unit 102, a display unit 103, an inputting unit 104, a process control unit 105, a network 107, a component inquiry unit 109 and a component identifier storing unit 111.

Figure 11:
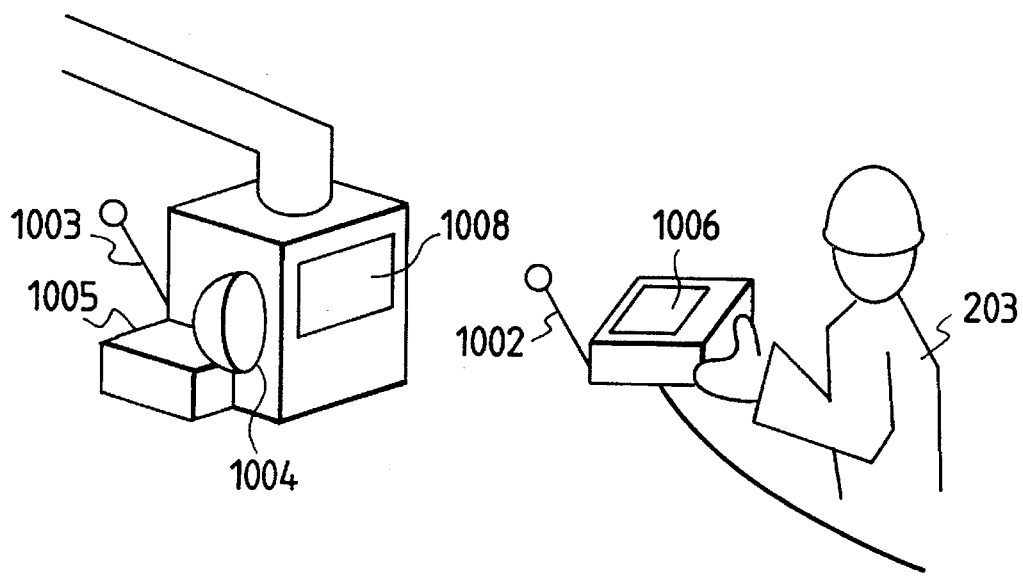
FIG. 11 is a diagram showing a manner of using a portable terminal device shown by FIG. 10.

FIG. 11 is a picture showing a way of using the portable terminal device shown by FIG. 10. The numeral 108 indicates the component, the numeral 1002 indicates the receiving antenna, the numeral 1003 indicates the transmitting antenna, the numeral 1004 indicates the access sensor, the numeral 1005 indicates the component ID transmitter, the numeral 1006 indicates the ID receiving type portable terminal device and the numeral 203 indicates the maintenance worker.

When a maintenance worker approaches near to a component with the ID receiving portable terminal device, the access sensor 1004 attached at the component detects the presence of the maintenance worker. As an access detecting method, a method of detecting an infrared ray generated by a human body is applicable. Besides the infrared ray method, the following methods can be applied, that is, a method of detecting changes in electrostatic capacity, a method of detecting changes in magnetic field and a method of detecting that a maintenance worker passes over a plate having a pressure sensor provided in front of a component.

If the presence sensor 1004 detects the access of a maintenance worker, the component ID transmitting unit 1005 transmits the ID of the component to which the maintenance worker approaches by using the ID transmitting antenna 103. A component ID transmitting unit 1005, an ID transmitting antenna 1003 and an access sensor 1004 are provided for each of the components, and the component ID is transmitted when a maintenance worker 203 approaches one of the components 108.

If a maintenance worker intends to gain information concerning a specific component or needs to control a specific component, the maintenance worker approaches the object component with the ID receiving type portable terminal device 1006 and inputs a command for selecting the object component using the inputting unit 104. In receiving the command, the terminal control unit 102 inquires as to the component ID from the component inquiry unit 109. The component inquiry unit 109 receives the component ID which is received by the receiving antenna 1002, from the ID transmitting antenna 1002.

If the component inquiry unit 109 receives the reply packet indicating that the pertinent component is found, it takes out the component ID from the packet and transfers the component ID to the component identifier storing unit 111. Thereafter, the terminal control unit 102 inquires as to component IDs stored in the component identifier storing unit 111 if needed, and exchanges the data concerning components with the process control computer 105 and other components. By this embodiment, it is possible to identify an object component without preparing a data base of components, and to gain information concerning an object component or to set control data into the object component.

Since a maintenance worker can obtain information concerning a component by pointing the portable terminal device, the necessary information for an object component can be quickly and certainly obtained. Especially, when quick and certain counteractions are needed, for example, in the case of an accident, the portable terminal device of the present invention is very effective.

Furthermore, since a component remote from a maintenance worker can be also quickly identified without reading a bar-code, information concerning any combination of components of which freedom is limited in conventional techniques, can be obtained, which considerably improves the freedom of the inspection work in a plant.

What is claimed is:

1. An information terminal system including a process control computer which controls a plant composed of a plurality of physical components, and a portable terminal device for inputting information to at least one of said process control computer and said components and for obtaining information from at least one of said process control computer and said components, said information terminal system comprising:

component identifying means provided in at least one of said process control computer and said portable terminal device, for identifying a component from a plurality of physical components included in a plant, by using a direction indicated by said portable terminal device, wherein information pertaining to one of said components, as identified by said component identifying means, is input and obtained by said portable terminal device.

2. An information terminal system including a process control computer which controls a plant composed of a plurality of physical components, and a portable terminal device for inputting information to at least one of said process control computer and said components and for obtaining information from at least one of said process control computer and said components, said information terminal system comprising:

component identifying means provided in at least one of said process control computer and said portable terminal device, for identifying a component which is nearest to said portable terminal device from plurality of physical components included in a plant, by using a direction indicated by said portable terminal device, wherein information pertaining to one of said components, as identified by said component identifying means, is input and obtained by said portable terminal device.

3. An information terminal system including a process control computer which controls a plant composed of a plurality of physical components, and a portable terminal device for inputting information to at least one of said process control computer and said components and for obtaining information from at least one of said process control computer and said components, said information terminal system comprising:

component map information storing means provided in at least one of said process control computer and said portable terminal device, for storing information on a location of each component of said plurality of physical components composing a plant;

location and direction identifying means provided in at least one of said process control computer and said portable terminal device, for identifying a location and a direction of orientation of said portable terminal device; and component map collating means provided in at least one of said process control computer and said portable terminal device, for identifying a component indicated by said portable terminal device by collating said measured location and direction of orientation of said portable terminal device with said information on said location of each component of said plurality of components stored in said component map information storing means, wherein information pertaining to one of said components, as identified by said component map collating means, is input and obtained by said portable terminal device.

4. An information system according to claim 3, wherein said portable terminal device includes a component identifier storing means for storing at least one of said identified components in the form of an identifier.

5. An information system according to claim 3, wherein said component map collating means identifies a component existing in a direction indicated by said portable terminal device and nearest to said portable terminal device as an object component to be treated.

6. An information system according to claim 3, wherein at least two kinds of sensors including a long range sensor and a short range sensor are provided in said location and direction measuring means for measuring said location and direction of said portable terminal device.

7. An information terminal system including a process control computer which controls a plant composed of a plurality of physical components, and a portable terminal device for inputting information to at least one of said process control computer and said components and for obtaining information from at least one of said process control computer and said components, said information terminal system comprising:

component appearance information storing means provided in at least one of said process control computer and said portable terminal device, for storing information on a physical appearance of each component of said plurality of physical components included in a plant;

image pickup means provided in at least one of said process control computer and said portable terminal device, for picking up an image of at least a part of a component existing in a direction indicated by said portable terminal device; and component appearance collating means provided in at least one of said process control computer and said portable terminal device, for identifying a component to be treated, by collating said picked up image with said information on said physical appearance of each component of said plurality of physical components, stored in said component appearance information storing means, wherein information pertaining to one of said components, as identified by said component appearance collating means, is input and obtained by said portable terminal device.

8. An information terminal system including a process control computer which controls a plant composed of a plurality of physical components, and a portable terminal device for inputting information to at least one of said process control computer and said components and for obtaining information from at least one of said process control computer and said components, said information terminal system comprising:

component sound information storing means provided in at least one of said process control computer and said portable terminal device, for storing features of sounds generated by each component of said plurality of components included within a plant;

component sound pickup means provided in at least one of said process control computer and said portable terminal device, for picking up sounds generated by each component of said plurality of components existing in a direction indicated by said portable terminal device; and component sound collating means provided in at least one of said process control computer and said portable terminal device, for identifying a component to be treated, by collating said picked up sounds with said features of said sounds of each component of said plurality of components, stored in said component sound information storing means, wherein information pertaining to one of said components, is identified by said component sound collating means, is input and obtained by said portable terminal device.

9. An information terminal system including a process control computer which controls a plant composed of a plurality of physical components, and a portable terminal device for inputting information to at least one of said process control computer and said components and for obtaining information from at least one of said process control computer and said components, said information terminal system comprising:

component temperature distribution information storing means provided in at least one of said process control computer and said portable terminal device, for storing features of a temperature distribution for each component of said plurality of components included within a plant;

component temperature distribution pickup means provided in at least one of said process control computer and said portable terminal device, for detecting said temperature distribution for each one of said components existing in a direction indicated by said portable terminal device; and component temperature distribution collating means provided in at least one of said process control computer and said portable terminal device, for identifying a component to be treated, by collating said detected in temperature distribution with said features of said temperature distribution of each component of said plurality of components, stored in said component temperature distribution information storing means, wherein information pertaining to one of said components, as identified by said component temperature distribution collating means, is input and obtained by said portable terminal device.

10. An information terminal system including a process control computer which controls a plant composed of a plurality of physical components, and a portable terminal device for inputting information to at least one of said process control computer and said components and for obtaining information from at least one of said process control computer and said components, said information terminal system comprising:

device access detecting means provided in preset ones of said plurality of components composing a plant, for detecting access of said portable terminal device to a component;

component identifier transmitting means provided in at least one of said process control computer and said preset ones of said plurality of components, for transmitting an identifier of a component of said preset ones, to which access of said portable terminal device is detected by said device access detecting means; and component identifier receiving means provided in at least one of said process control computer and said portable terminal device, for receiving said transmitted identifier of said component, wherein information pertaining to one of said components, as identified by said device access detecting means, is input and obtained by said portable terminal device.

11. A portable terminal device for inputting information to at least one of a process control computer which controls a plant composed of a plurality of physical components, and a portable terminal device for inputting information to and obtaining information from at least one of said process control computer and said components, said portable terminal device comprising:

component map information storing means for storing information on a location of each component of said plurality of components included in a plant; and detection means for detecting a location of said portable terminal device by using said information on said location of each component of said plurality components included in said plant stored in said component map information storing means, wherein information on said location of said portable terminal device and on components around said terminal device is input and obtained by said portable terminal device.

12. An information terminal system including a process control computer which controls a plant composed of a plurality of physical components, and a portable terminal device for inputting information to at least one of said process control computer and said components and for gaining information from at least one of said process control computer and said components, said information terminal system comprising:

characteristic information storing means for storing characteristic information which is peculiar to each component of said plurality of components composing a plant;

pickup means for picking up information concerning the peculiar characteristic of a component of said plurality of components existing in a direction indicated by said portable terminal device; and collating means for identifying said component by collating said picked up information with said characteristic information for each of said components as stored in said characteristic information storing means, wherein information pertaining to one of said components, as identified by said component collating means, is input and obtained by said portable terminal device.

13. An information system according to claim 12, wherein said characteristic information is component appearance information and said pickup means includes an image pickup device.

14. An information system according to claim 12, wherein said characteristic information is sound information indicating features of sounds generated by said components.

15. An information system according to claim 12, wherein said characteristic information is temperature distribution information indicating features of a temperature distribution of each of said components.

* * * * *